US012177948B2

(12) United States Patent
Jiang

(10) Patent No.: US 12,177,948 B2
(45) Date of Patent: Dec. 24, 2024

(54) METHOD FOR ADJUSTING COLOR RENDERING INDEX OF LIGHT SOURCE AND STAGE LIGHT FIXTURE USING SAME

(71) Applicant: Guangzhou Haoyang Electronic Co., Ltd., Guangdong (CN)

(72) Inventor: Weikai Jiang, Guangdong (CN)

(73) Assignee: GUANGZHOU HAOYANG ELECTRONIC CO., LTD., Guangdong (CN)

(*) Notice: Subject to any disclaimer, the term of this patent is extended or adjusted under 35 U.S.C. 154(b) by 108 days.

(21) Appl. No.: 18/176,317

(22) Filed: Feb. 28, 2023

(65) Prior Publication Data

US 2024/0179813 A1 May 30, 2024

Related U.S. Application Data

(63) Continuation of application No. PCT/CN2023/077821, filed on Feb. 23, 2023.

(30) Foreign Application Priority Data

Nov. 30, 2022 (CN) ......................... 202211519176.9

(51) Int. Cl.

| | |
|---|---|
| ***H05B 45/18*** | (2020.01) |
| ***F21S 10/02*** | (2006.01) |
| ***F21W 131/406*** | (2006.01) |
| ***H05B 45/28*** | (2020.01) |

(52) U.S. Cl.

CPC ............. *H05B 45/18* (2020.01); *H05B 45/28* (2020.01); *F21S 10/02* (2013.01); *F21W 2131/406* (2013.01)

(58) Field of Classification Search

CPC ........ H05B 45/28; H05B 45/20; H05B 45/18; F21W 2131/406; F21S 10/02

See application file for complete search history.

(56) References Cited

U.S. PATENT DOCUMENTS

| | | | | |
|---|---|---|---|---|
| 2023/0358370 | A1* | 11/2023 | Iancu | H05B 45/20 |
| 2023/0397308 | A1* | 12/2023 | Petluri | F21K 9/64 |

FOREIGN PATENT DOCUMENTS

| | | | | | |
|---|---|---|---|---|---|
| CN | 111010765 | A | * | 4/2020 | |
| CN | 108954041 | B | * | 6/2020 | F21K 9/64 |
| CN | 109451624 | B | * | 1/2021 | H05B 45/20 |
| CN | 216521202 | U | * | 5/2022 | |

* cited by examiner

*Primary Examiner* — Raymond R Chai

(74) *Attorney, Agent, or Firm* — MUNCY, GEISSLER, OLDS & LOWE, P.C.

(57) ABSTRACT

A method for adjusting color rendering index of a light source and a stage light fixture are provided. The light source has a first LED chip set with a first color rendering index and a second LED chip set with a second color rendering index. The range of chromaticity differences of a target spectrum and color differences of 14 Munsell color samples of the target spectrum are defined according to a target spectral power distribution of a reference light source under a target color rending index and a target color temperature. The light intensity control parameter $K_1$, $K_2$ of the first LED chip set and the second LED chip set are adjusted, and a relative spectral power distribution of synthesized lighting of the controlled light source is calculated to search for values of $K_1$ and $K_2$ enabling the relative spectral power distribution to fall within the range.

15 Claims, 5 Drawing Sheets

METHOD FOR ADJUSTING COLOR RENDERING INDEX OF LIGHT SOURCE AND STAGE LIGHT FIXTURE USING SAME

CROSS REFERENCE TO RELATED APPLICATIONS

The present application is a continuation of International Application No. PCT/CN2023/077821, filed on Feb. 23, 2023, which claims priorities from Chinese Invention Application No. 202211519176.9 filed on Nov. 30, 2022, all of which are hereby incorporated herein by reference.

TECHNICAL FIELD

The present invention relates to the technical field of adjusting color rendering indexes of light sources, and more particularly, relates to a method for adjusting color rendering index of a light source and a stage light fixture using the method.

BACKGROUND

A color rendering index (CRI) refers to the capability of a light source to restore the visual perception of an object to the human in sunlight. The higher the color rendering property is, the closer the value of the color rendering index is to 100, thus the higher the capacity for reproducing the color of the object is and the easier it is for the human eye to distinguish the color of the object. However, for the light source, usually, the higher the color rendering index thereof, the lower the brightness will be. Stage light fixtures, as stage illuminating light fixtures, are required to take both the color rendering index and the brightness into account, while the color rendering index of the light source of the existing stage light fixture usually cannot be adjusted, or can only be switched between modes of high rendering index and low color rendering index, which cannot be adjusted at will according to requirements with both the color rendering index and the brightness taken into consideration.

SUMMARY

Accordingly, the present invention provides a method for adjusting color rendering index of a light source, which can freely adjust the color rendering index of the light source to a certain value, and is capable of increasing the color rendering index as much as possible while ensuring the brightness thereof.

The method for adjusting the color rendering index of the light source according the present invention mainly includes the following four steps.

The controlled light source has a first LED chip set and a second LED chip set. The first LED chip set has a first color rendering index, and the second LED chip set has a second color rendering index. In step S1, the color temperature of the first LED chip set and the color temperature of the second LED chip set, and respective relative spectral power distributions $P_A(\lambda)$ and $P_B(\lambda)$ at the maximum brightness of the first LED chip set and the second LED chip set are acquired, $P_A(\lambda)$ and $P_B(\lambda)$ then are normalized, normalization coefficients thereof being denoted as $K_A$ and $K_B$.

In step S2, according to an input target color rendering index and a target color temperature, a normalized relative spectral power distribution $P_{target}(\lambda)$ of a reference light source is obtained, which is taken as a target spectrum, and the range of chromaticity differences of the target spectrum and the range of color differences of 14 Munsell color samples of the target spectrum are defined.

In step S3, the light intensity control parameter $K_1$ of the first LED chip set and the light intensity control parameter $K_2$ of the second LED chip set are repeatedly adjusted, wherein $0 \leq K_1 \leq K_A$ and $0 \leq K_2 \leq K_B$, a relative spectral power distribution $P_{synthesized}(\lambda)=K_1P_A(\lambda)+K_2P_B(\lambda)$ of a spectrum of a synthesized lighting of the controlled light source according to $K_1$, $K_2$, $P_A(\lambda)$ and $P_B(\lambda)$ is calculated, and then values of $K_1$ and $K_2$ enabling the relative spectral power distribution $P_{synthesized}(\lambda)$ to fall within the range of chromaticity differences of the target spectrum and the range of color differences of 14 Munsell color samples of the target spectrum are searched.

In step S4, according to the found values of $K_1$ and $K_2$, the first LED chip set and the second LED chip set are respectively controlled to emit lighting.

In the present invention, the controlled light source including the first LED chip set with the first color rendering index and the second LED chip set with the second color rendering index is provided. The range of chromaticity differences of the target spectrum and the range of color differences of 14 Munsell color samples of the target spectrum are defined according to the target spectral power distribution $P_{target}(\lambda)$ of the reference light source under the target color rending index and the target color temperature. Then the light intensity control parameter $K_1$ of the first LED chip set and the light intensity control parameter $K_2$ of the second LED chip set are adjusted, the relative spectral power distribution $P_{synthesized}(\lambda)=K_1P_A(\lambda)+K_2P_B(\lambda)$ of the spectrum of the synthesized lighting of the controlled light source is calculated to search for the values of $K_1$ and $K_2$ enabling the relative spectral power distribution $P_{synthesized}(\lambda)$ to fall within the range of chromaticity differences of the target spectrum and the range of color differences of 14 Munsell color samples of the target spectrum. The color rendering index of the controlled light source thus can be adjusted according to the selected proper values of $K_1$ and $K_2$ as needed according to the present invention.

According to the present invention, the first LED chip set and the second LED chip set may have the same color temperature, and the target color temperature is the color temperature of the first LED chip set and the second LED chip set. In this way, it is not needed to consider the color temperature problem in the process of adjusting the color rendering index, and it is thus convenient to calculate the values of $K_1$ and $K_2$ required by the first LED chip set and the second LED chip set to achieve the target color rendering index.

About choice of the reference light source, according to the present invention, when the color temperature of the controlled light source is greater than 5000 K, a CIE standard illuminant D can be selected as the reference light source, and when the color temperature of the controlled light source is less than 5000 K, a blackbody radiation light source can be selected as the reference light source. As such, higher similarity between the reference light source and the controlled light source can be made, so that the controlled light source can be better simulated for calculation according to the reference light source.

The first LED chip set and the second LED chip set may be both white light chips according to the present invention. That is, the first LED chip set and the second LED chip set both emit white lighting, which may have higher light-emitting efficiency.

Especially, in step S3, after finding the first set of values of $K_1$ and $K_2$ enabling the normalized $P_{synthesized}(\lambda)$ to approach the target spectrum, the first set of the values of $K_1$ and $K_2$ are changed within a certain range to calculate the relative spectral power distribution $P_{synthesized}(\lambda)$ of the spectrum of the synthesized lighting according to the changed values of $K_1$ and $K_2$ and further normalized to search for other values of $K_1$ and $K_2$ enabling the normalized $P_{synthesized}(\lambda)$ to approach the target spectrum. This is because the eligible values of $K_1$ and $K_2$ are generally fallen within a certain region. Approaching the target spectrum means falling within the range of chromaticity differences of the target spectrum and the range of color differences of 14 Munsell color samples of the target spectrum in the present invention. Accordingly, after the first set of eligible values of $K_1$ and $K_2$ are found, other eligible values of $K_1$ and $K_2$ can be searched out around the values. It is thus possible to quickly search out all the eligible values of $K_1$ and $K_2$, thereby saving time and calculation effort.

As interpolation method is a conventional method for fast solving values, an interpolation method is used to search for the first set of values of $K_1$ and $K_2$ enabling the normalized $P_{synthesized}(\lambda)$ to approach the target spectrum in the present invention. With such method, the values of $K_1$ and $K_2$ can be found fast, thereby further saving time and calculation effort.

Interpolation method can be also used when changing the values of $K_1$ and $K_2$ within a certain range, however, the order of magnitude of the interpolation method at this step is lower than that of the interpolation method for searching the first set of values of $K_1$ and $K_2$. In such way, the calculation speed may be further increased, and the search process of $K_1$ and $K_2$ thus can be more accurate.

According to the present invention when $K_A=1$ and $K_B=1$, a certain range in which the values of $K_1$ and $K_2$ are changed refers to $K_1-0.1$ to $K_1+0.1$ and $K_2-0.1$ to $K_2+0.1$. That is, when $K_A=1$ and $K_B=1$, the eligible values of $K_1$ and $K_2$ are generally distributed in a range of an interval within 0.1, respectively. Therefore, after finding the first set of values of $K_1$ and $K_2$, the corresponding values of $K_1$ and $K_2$ fluctuate by 0.1 up and down, thus almost all the eligible values of $K_1$ and $K_2$ can be found.

In step S3, a plurality of sets of eligible values of $K_1$ and $K_2$ are searched, and the power and brightness of the synthesized lighting at this moment are calculated. In step S4, a proper set of values of $K_1$ and $K_2$ are selected according to certain power or brightness requirements to respectively control the first LED chip set and the second LED chip set to emit lighting. It is thus possible to achieve lighting with the target color rendering index emitted from the controlled light source at a specified power or brightness in a certain power or brightness range.

In step S4, according to the input power of the synthesized lighting, values of $K_1$ and $K_2$ under such power of the synthesized lighting are selected from the plurality of sets of values of $K_1$ and $K_2$ corresponding to the target color rendering index, so that the power of the synthesized lighting of the controlled light source remains constant in the process of adjusting the controlled light source to achieve different color rendering indexes. In other way, in step S4, values of $K_1$ and $K_2$ for maximizing the power of the combined power are selected from the plurality of sets of values of $K_1$ and $K_2$ under the target color rendering index, so that in the process of adjusting the controlled light source to achieve different color rendering indexes, at each color rendering index of the controlled light source, the power of the synthesized lighting can reach the maximum. Alternatively, in step S4, values of $K_1$ and $K_2$ for maximizing the brightness of the synthesized lighting are selected from the plurality of sets of values of $K_1$ and $K_2$ under the target color rendering index, so that in the process of adjusting the controlled light source to achieve different color rendering indexes, at each color rendering index of the controlled light source, the brightness of the synthesized lighting is maximized.

According to the present invention, in step S3, the chromaticity difference satisfies the requirements of the color range in different color intervals corresponding to the MacAdam ellipse on a CIE1976 UCS diagram. Although different criteria can be chosen for different light fixture types, all need to conform to the color range in the different color intervals corresponding to the McAdam ellipse, so that the values of $K_1$ and $K_2$ can be screened within a reasonable range to avoid too many interference values, thus increasing the computing speed.

In step S3, the method for searching for values of $K_1$ and $K_2$ enabling the relative spectral power distribution $P_{synthesized}(\lambda)$ to fall within the range of color differences of 14 Munsell color samples of the target spectrum specifically includes five steps.

In step S31, according to $\varphi_k(\lambda)$ corresponding to a certain set of values of $K_1$ and $K_2$, working out a color coordinate $(x_k, y_k)$, a tristimulus value $(X_k, Y_k, Z_k)$ and a CIE1976 UCS chromaticity coordinate $(u_k, v_k)$ of the controlled light source, and a color coordinate $(x_{k,i}, y_{k,i})$, a CIE tristimulus value $(X_{k,i}, Y_{k,i}, Z_{k,i})$ and a chromaticity coordinate $(u_{k,i}, v_{k,i})$ of each test color i (i=1, 2, 3 . . . , 14) of 14 Munsell color samples of the controlled light source, wherein $\varphi_k(\lambda)=P_{synthesized}(\lambda)$.

In step S32, according to the relative spectral power distribution $P_{target}(\lambda)$ of the reference light source, calculating a chromaticity coordinate $(u_{r,i}, v_{r,i})$ of each test color i (i=1, 2, 3 . . . , 14) of 14 Munsell color samples of the reference light source and a CIE1976 UCS chromaticity coordinate $(u_r, v_r)$.

In step S33, correcting the chromaticity coordinate $(u_k, v_k)$ of the controlled light source to the chromaticity coordinate $(u_r, v_r)$ of the reference light source, i.e., $$\begin{cases} u'_k = u_r \\ v'_k = v_r \end{cases},$$

correcting the chromaticity coordinate $(u_{k,i} v_{k,i})$ of each color sample i of the 14 Munsell color samples of the controlled light source to a chromaticity coordinate $(u'_{k,i}, v'_{k,i})$ of the reference light source, specifically as follows:

according to a formula $$\begin{cases} c = \frac{1}{v} * (4.0 - u - 10v) \\ d = \frac{1}{v} (1.708v + 0.404 - 1.481u) \end{cases},$$

respectively obtaining chromaticity coordinate correction coefficients $c_r$ and $d_r$ of the reference light source:

$$\begin{cases} c_r = \frac{1}{v_r} * (4.0 - u_r - 10v_r) \\ d_r = \frac{1}{v_r} (1.708v_r + 0.404 - 1.481u_r) \end{cases},$$

chromaticity coordinate correction coefficients $c_k$ and $d_k$ of the controlled light source:

$$\begin{cases} c_k = \frac{1}{v_k} * (4.0 - u_k - 10v_k) \\ d_k = \frac{1}{v_k} (1.708v_k + 0.404 - 1.481u_k) \end{cases},$$

and chromaticity coordinate correction coefficients $c_{k,i}$ and $d_{k,i}$ of each test color of the 14 Munsell color samples under the illumination of the controlled light source:

$$\begin{cases} c_{k,i} = \frac{1}{v_{k,i}} * (4.0 - u_{k,i} - 10v_{k,i}) \\ d_{k,i} = \frac{1}{v_{k,i}} (1.708v_{k,i} + 0.404 - 1.481u_{k,i}) \end{cases};$$

and according to the chromaticity coordinate correction coefficients $c_r$ and $d_r$ of the reference light source, the chromaticity coordinate correction coefficients $c_k$ and $d_k$ of the controlled light source, and the chromaticity coordinate correction coefficients $c_{k,i}$ and $d_{k,i}$ of each test color of the 14 Munsell color samples under the illumination of the controlled light source, obtaining the corrected chromaticity coordinates $$u'_{k,i}v'_{k,i}: \begin{cases} u'_{k,i} = \dfrac{10.872 + 0.404 * (C_r/C_k) * C_{k,i} - 4 * \left(\frac{d_r}{d_k}\right) * d_{k,i}}{16.518 + 1.481 * (C_r/C_k) * C_{k,i} - \left(\frac{d_r}{d_k}\right) * d_{k,i}} \\ v'_{k,i} = \dfrac{5.520}{16.518 + 1.481 * (C_r/C_k) * C_{k,i} - \left(\frac{d_r}{d_k}\right) * d_{k,i}} \end{cases}$$

of each color sample i of the 14 Munsell color samples of the controlled light source.

In step S34, according to the chromaticity coordinate ($u_{r,i}$, $v_{r,i}$) of each test color of the 14 Munsell color samples of the reference light source and the chromaticity coordinate ($u_r$, $v_r$) of the reference light source, calculating the coordinate values $$U^*_{r,i}, V^*_{r,i} \text{ and } W^*_{r,i}: \begin{cases} W^*_{r,i} = 25Y_{r,i}^{\frac{1}{3}} - 17 \\ U^*_{r,i} = 13W^*_{r,i} \ (u_{r,i} - u_r) \\ V^*_{r,i} = 13W^*_{r,i} \ (v_{r,i} - v_r) \end{cases}$$

of each test color of the 14 Munsell color samples of the reference light source in a CIE1964 uniform color space; wherein $Y_{r,i}^{1/3}$ is the ⅓ square root coefficient of the tristimulus value Y of each test color of the 14 Munsell color samples of the reference light source, wherein $1 \le Y \le 100$; and according to the CIE1976 UCS corrected chromaticity coordinate $u'_{k,i}v'_{k,i}$ of each test color of the 14 Munsell color samples of the controlled light source and the corrected chromaticity coordinate ($u'_k$,$v'_k$) of the controlled light source, calculating coordinate values $$U^*_{k,i}, V^*_{k,i} \text{ and } W^*_{k,i}: \begin{cases} W^*_{k,i} = 25Y_{k,i}^{\frac{1}{3}} - 17 \\ U^*_{k,i} = 13W^*_{r,i} \ (u'_{r,i} - u'_k) \\ V^*_{k,i} = 13W^*_{r,i} \ (v'_{r,i} - v'_k) \end{cases}$$

of each test color of the 14 Munsell color samples of the controlled light source in the CIE1964 uniform color space, wherein $Y_{k,i}^{1/3}$ is the ⅓ square root coefficient of the tristimulus value Y of each test color of the 14 Munsell color samples of the controlled light source, wherein $1 \le Y \le 100$.

In step S35, using the color difference formula of CIE1964 to obtain the color difference $\Delta E_i = [(U_{r,i}^* - U_{k,i}^*)^2 + (V_{r,i}^* - V_{k,i}^*)^2 + (W_{r,i}^* - W_{k,i}^*)^2]$ of the test color i of the same Munsell color sample corresponding to the controlled light source and the reference light source, and judging whether the color difference $\Delta E_i$ of the test color i of each Munsell color sample is within the range of color differences of 14 Munsell color samples of the target spectrum, if yes, retaining the set of values of $K_1$ and $K_2$, and otherwise, verifying a next set of values of $K_1$ and $K_2$. Therefore, the values of $K_1$ and $K_2$ enabling the relative spectral power distribution $P_{synthesized}(\lambda)$ of the spectrum of synthesized lighting of the controlled light source to conform to the range of color differences of 14 Munsell color samples of the target spectrum are acquired.

The present invention further provides a stage light fixture, using the method described above to adjust the color rendering index of the light source within a light head.

DETAILED DESCRIPTION

Figure 1:
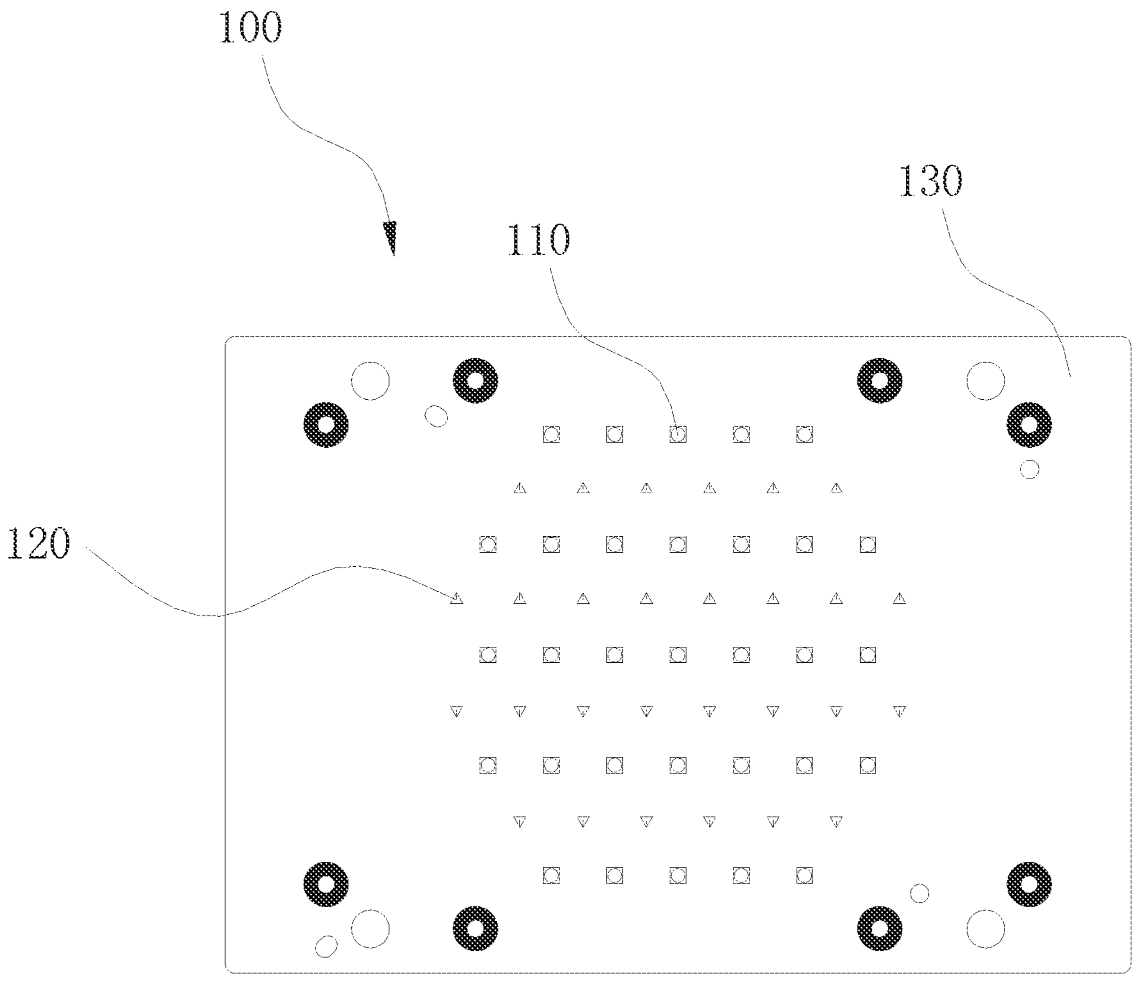
FIG. 1 is a schematic structural diagram of a controlled light source according to one embodiment of the present invention.

The accompanying drawings are for exemplary illustration only, and should not be construed as limitations on this patent; in order to better illustrate this embodiment, some parts in the accompanying drawings may be omitted, enlarged or reduced, and they do not represent the size of the actual product; for those skilled in the art, it is understandable that certain well-known structures and descriptions thereof in the drawings may be omitted. The positional relationship described in the drawings is only for exemplary illustration, and should not be construed as limitations on this patent.

Figure 3:
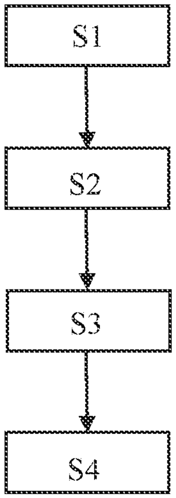
FIG. 3 is a schematic flowchart of a method for adjusting a color rendering index of the light source according to the present invention.

FIG. 3 shows a method for adjusting color rendering index of a light source according to an embodiment of the present invention, which mainly includes four steps.

Figure 2:
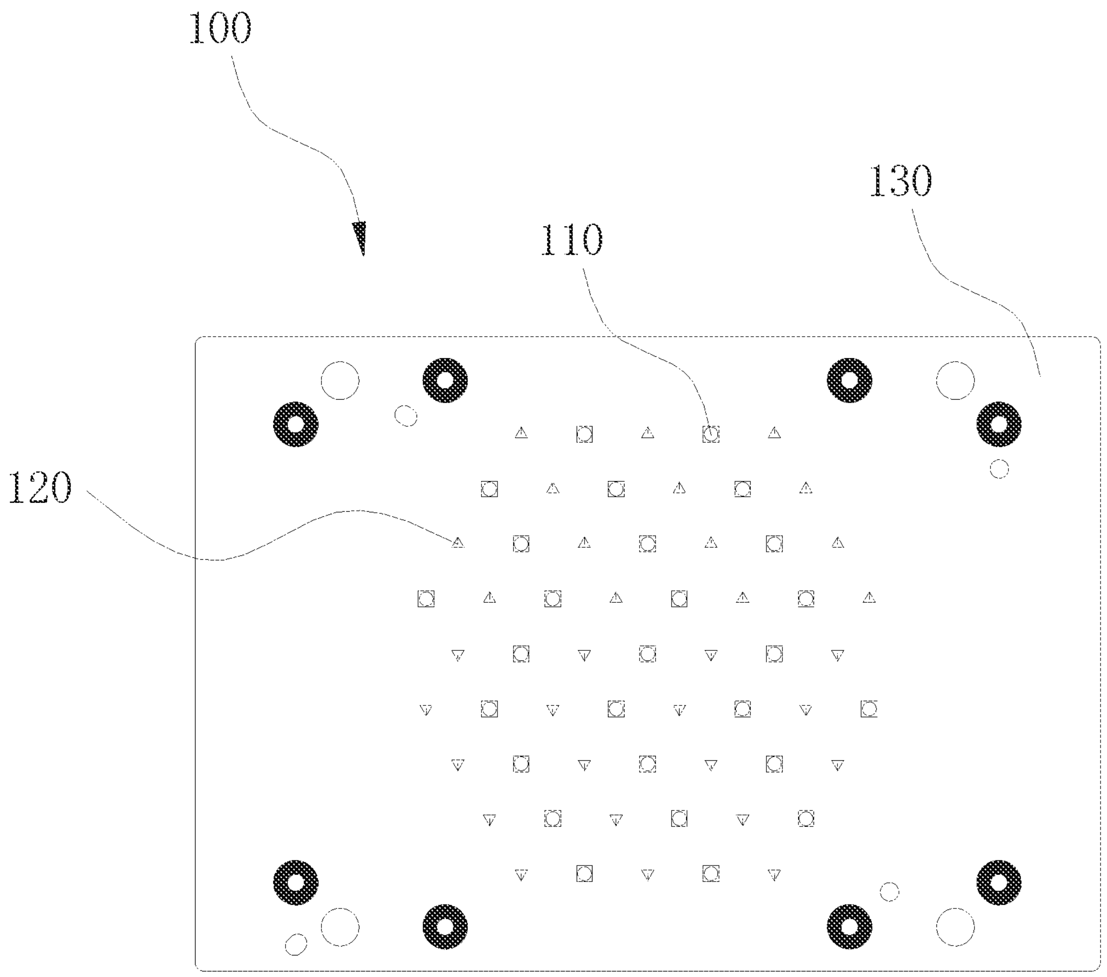
FIG. 2 is a schematic structural diagram of the controlled light source according to another embodiment of the present invention.

As shown in FIG. 1 and FIG. 2, a controlled light source 100 is provided, which includes a first LED chip set 110 and a second LED chip set 120. The first LED chip set 110 has a first color rendering index, and the second LED chip set 120 has a second color rendering index.

In step S1, the color temperature of the first LED chip set 110 and the color temperature of the second LED chip set 120, and relative spectral power distributions $P_A(\lambda)$ and $P_B(\lambda)$ at the maximum brightness are acquired. $P_A(\lambda)$ and $P_B(\lambda)$ then are normalized, the normalization coefficients being denoted as $K_A$ and $K_B$.

In step S2, according to an input target color rendering index and a target color temperature, which target color temperature is especially a certain value between the color temperature of the first LED chip set 110 and the color temperature of the second LED chip set 120, a normalized relative spectral power distribution $P_{target}(\lambda)$ of a reference light source is obtained, which is taken as a target spectrum, and the range of chromaticity differences of the target spectrum and the range of color differences of 14 Munsell color samples of the target spectrum are defined.

In step S3, the light intensity control parameter $K_1$ of the first LED chip set 110 and the light intensity control parameter $K_2$ of the second LED chip set 120 are repeatedly adjusted, wherein $0 \le K_1 \le K_A$ and $0 \le K_2 \le K_B$, a relative spectral power distribution $P_{synthesized}(\lambda)=K_1P_A(\lambda)+K_2P_B(\lambda)$ of a spectrum of a synthesized lighting of the controlled light source 100 is calculated according to $K_1$, $K_2$, $P_A(\lambda)$ and $P_B(\lambda)$, and then values of $K_1$ and $K_2$ enabling the relative spectral power distribution $P_{synthesized}(\lambda)$ to fall within the range of chromaticity differences of the target spectrum and the range of color differences of 14 Munsell color samples of the target spectrum are searched.

In step S4, according to the values of $K_1$ and $K_2$, the first LED chip set 110 and the second LED chip set 120 are respectively controlled to emit lighting.

In the method for adjusting the color rendering index of a light source according to the embodiment, the controlled light source 100 including the first LED chip set 110 having the first color rendering index and the second LED chip set 120 having the second color rendering index is provided, the range of chromaticity differences of the target spectrum and the range of color differences of 14 Munsell color samples of the target spectrum are defined according to the target spectral power distribution $P_{target}(\lambda)$ of the reference light source under the target color rending index and the target color temperature, then the light intensity control parameter $K_1$ of the first LED chip set 110 and the light intensity control parameter $K_2$ of the second LED chip set 120 are adjusted, the relative spectral power distribution $P_{synthesized}(\lambda)=K_1P_A(\lambda)+K_2P_B(\lambda)$ of the spectrum of synthesized lighting of the controlled light source 100 is further calculated to search for the values of $K_1$ and $K_2$ enabling the relative spectral power distribution $P_{synthesized}(\lambda)$ to fall within the range of chromaticity differences of the target spectrum and the range of color differences of 14 Munsell color samples of the target spectrum. The color rendering index of the controlled light source 100 thus can be adjusted according to the selected proper values of $K_1$ and $K_2$ as needed.

Preferably, in step S2, according to the input target color rendering index and the target color temperature, the normalized relative spectral power distribution $P_{target}(\lambda)$ of the reference light source can be obtained by looking up relevant tables. For example, for a D65 standard light source, which has color temperature of 6500 K and wavelength of 380 nm to 780 nm, under the condition of the known color rendering index and the color temperature thereof, the normalized relative spectral power distribution thereof can be easily obtained on the Internet or according to a relevant specification of the D65 standard light source.

Preferably, the first color rendering index is 65, the second color rendering index is 95, and the target color rendering index is a value between 65 and 95.

As shown in FIG. 1, the first LED chip set 110 and the second LED chip set 120 can be respectively arranged in a plurality of rows, and each row of the first LED chip set 110 and the second LED chip set 120 are especially arranged in a staggered manner, that is, each row of the first LED chip set 110 follows each row of the second LED chip set 120. Such configuration facilitates light mixing and control, and also facilitates arrangement of wiring.

As shown in FIG. 2, in addition to arrangement in rows, each light-emitting chip of the first LED chip set 110 and each light-emitting chip of the second LED chip set 120 are arranged in a staggered manner. In such configuration, light emitted form the first LED chip set 110 and the second LED chip set 120 can be mixed more uniformly, thereby improving the uniformity of light beams of the light source 100.

In other embodiments, the light source includes a third LED chip set with a third color rendering index. One light-emitting chip of the first LED chip set 110, one light-emitting chip of the second LED chip set 120, and one light-emitting chip of the third LED chip set may together form a point light source (not shown in the figures).

At least one of the first LED chip set 110 and the second LED chip set 120 can be independently controlled. That is, the brightness of the first LED chip set 110 or the second LED chip set 120 can be independently raised or lowered, rather than individually controlling several light-emitting chips of the first LED chip set 110 or the second LED chip set 120, or changing the brightness of several sets of light-emitting chips of the first LED chip set 110 or the second LED chip set 120.

The wavelengths of light emitted out of the first LED chip set 110 and the second LED chip set 120 are preferably in the range of 380 nm to 780 nm, i.e., a range of light visible to the naked eye.

A third LED chip set with a third color rendering index different from that of the first LED chip set 110 and the second LED chip set 120 may further be included, which may be mixed together to achieve the target color rendering index. With such configuration, more combinations can be obtained.

In a preferred embodiment of the present invention, the first LED chip set 110 and the second LED chip set 120 have the same color temperature, and the target color temperature is the color temperature of the first LED chip set 110 and the second LED chip set 120. In such way, it is not needed to consider the color temperature problem in the process of adjusting the color rendering index. It is thus convenient to calculate the values of $K_1$ and $K_2$ required by the first LED chip set 110 and the second LED chip set 120 to achieve the target color rendering index.

The common color temperature is preferably 6500±500 K, and a CIE standard illuminant D can be selected as the reference light source.

In a preferred embodiment of the present invention, when the color temperature of the controlled light source 100 is greater than 5000 K, a CIE standard illuminant D is selected as the reference light source, while when the color temperature is less than 5000 K, a blackbody radiation light source is selected as the reference light source. As a result, the similarity between the reference light source and the controlled light source 100 can be much higher, the controlled light source 100 thus can be better simulated for calculation according to the corresponding reference light source.

According to a preferred embodiment of the present invention, the first LED chip set 110 and the second LED chip set 120 can be both white light chips. That is, the first LED chip set 110 and the second LED chip set 120 both emit white lighting, with higher light emitting efficiency.

In a preferred embodiment of the present invention, in step S3, after finding the first set of values of $K_1$ and $K_2$ enabling normalized $P_{synthesized}(\lambda)$ to approach the target spectrum, the first set of values of $K_1$ and $K_2$ are changed within a certain range, then the relative spectral power distribution $P_{synthesized}(\lambda)$ of the spectrum of the synthesized lighting is calculated according to the changed values of $K_1$ and $K_2$ and further normalized to search for other values of $K_1$ and $K_2$ enabling the normalized $P_{synthesized}(\lambda)$ to approach the target spectrum. This is because the eligible values of $K_1$ and $K_2$ are generally fallen within a certain region. Accordingly, after the first set of eligible values of $K_1$ and $K_2$ are found, other eligible values of $K_1$ and $K_2$ can be searched out around the values. It is thus possible to quickly search out all the eligible values of $K_1$ and $K_2$, thereby saving time and calculation effort.

In a preferred embodiment of the present invention, an interpolation method is used to search for the first set of values of $K_1$ and $K_2$ enabling the normalized $P_{synthesized}(\lambda)$ to approach the target spectrum. The interpolation method is a conventional method for fast solving values, which thus can be used to fast find the values of $K_1$ and $K_2$ to save time and calculation effort.

In this embodiment, the adjustment unit in the interpolation method is preferably 0.1.

In a preferred embodiment of the present invention, the values of $K_1$ and $K_2$ are changed within a certain range by interpolation method. However, the order of magnitude of the interpolation method at this moment is lower than that of the interpolation method for searching the first set of values of $K_1$ and $K_2$. With such way, the calculation speed can be increased, and the search process of $K_1$ and $K_2$ thus can be more accurate.

In this embodiment, the adjustment unit of the interpolation method in the changing of the values of $K_1$ and $K_2$ within a certain range is 0.01.

In a preferred embodiment of the present invention, when $K_A$=1 and $K_B$=1, a certain range refers to $K_1$−0.1 to $K_1$+0.1 and $K_2$−0.1 to $K_2$+0.1. For example, when $K_A$=1 and $K_B$=1, eligible values of $K_1$ and $K_2$ are generally distributed in a range of an interval within 0.1, respectively, so that after finding the first set of values of $K_1$ and $K_2$, the corresponding values of $K_1$ and $K_2$ fluctuate by 0.1 up and down, thus almost all the eligible values of $K_1$ and $K_2$ can be found.

In a preferred embodiment of the present invention, in step S3, a plurality of sets of eligible values of $K_1$ and $K_2$ are searched, and the relative power and brightness of the synthesized lighting at this moment are calculated. In step S4, a proper set of values of K and $K_2$ are selected according to power or brightness requirements to respectively control the first LED chip set 110 and the second LED chip set 120 to emit lighting. It is thus possible to achieve lighting with the target color rendering index emitted from the controlled light source 100 at a specified power or brightness in a certain power or brightness range.

In a preferred embodiment of the present invention, in step S4, according to the input power of the synthesized lighting, values of $K_1$ and $K_2$ corresponding to such power of the synthesized lighting are selected from the plurality of sets of values of $K_1$ and $K_2$ under the target color rendering index, so that the power of the synthesized lighting of the controlled light source 100 remains constant in the process of adjusting the controlled light source 100 to achieve different color rendering indexes. Alternatively, in step S4, values of $K_1$ and $K_2$ for maximizing the power of the synthesized lighting are selected from the plurality of sets of values of $K_1$ and $K_2$ under the target color rendering index, so that in the process of adjusting the controlled light source 100 to achieve different color rendering indexes, at each co rendering index of the controlled light source 100, the power of the synthesized lightinglor can reach the maximum. In other possible way, in step S4, values of $K_1$ and $K_2$ for maximizing the brightness of the synthesized lighting are selected from the plurality of sets of values of $K_1$ and $K_2$ under the target color rendering index so that in the process of adjusting the controlled light source 100 to achieve different color rendering indexes, at each color rendering index of the controlled light source 100, the brightness of the synthesized lighting is maximized.

In a preferred embodiment of the present invention, in step S3, the chromaticity difference satisfies the requirements of the color range in different color intervals corresponding to the MacAdam ellipse on a CIE1976 UCS diagram. Different criteria can be chosen for different light fixture types, but all are required to conform to the color range of the different color intervals corresponding to the McAdam ellipse, so that the values of $K_1$ and $K_2$ can be screened within a reasonable range to avoid too many interference values, thus increasing the computing speed.

Preferably, the chromaticity difference satisfies the requirements of the five-order color range of the different color intervals corresponding to the MacAdam ellipse on the CIE1976 UCS diagram. Such method adapts to the current process technology and in line with the color difference requirements of conventional light fixtures.

Figure 4:
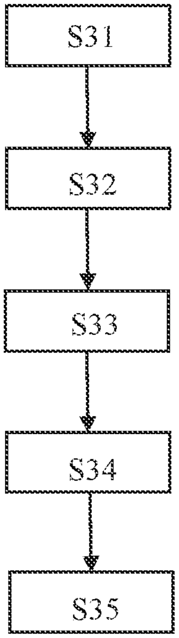
FIG. 4 is a schematic flowchart of searching for values of $K_1$ and $K_2$ enabling $P_{synthesized}(\lambda)$ to fall within the range of color differences of 14 Munsell color samples of a target spectrum.

Referring to FIG. 4, according to a preferred embodiment of the present invention, in step S3, the method for searching for values of $K_1$ and $K_2$ enabling the relative spectral power distribution $P_{synthesized}(\lambda)$ to fall within the range of color differences of 14 Munsell color samples of the target spectrum specifically includes five steps.

In step S31, according to $\varphi_k(\lambda)$ corresponding to a certain set of values of $K_1$ and $K_2$, working out a color coordinate $(x_k, y_k)$, a tristimulus value $(X_k, Y_k, Z_k)$ and a CIE1976 UCS chromaticity coordinate $(u_k, v_k)$ of the controlled light source 100, and a color coordinate $(x_{k,i}, y_{k,i})$, a CIE tristimulus value $(X_{k,i}, Y_{k,i}, Z_{k,i})$ and a chromaticity coordinate $(u_{k,i} v_{k,i})$ of each test color i (i=1, 2, 3 . . . , 14) of 14 Munsell color samples of the controlled light source 100, wherein $\varphi_k(\lambda)=P_{synthesized}(\lambda)$.

In step S32, according to the relative spectral power distribution $P_{target}(\lambda)$ of the reference light source, calculating a chromaticity coordinate $(u_{r,i} v_{r,i})$ of each test color i (i=1, 2, 3 . . . , 14) of 14 Munsell color samples of the reference light source and a CIE1976 UCS chromaticity coordinate $(u_r, r_r)$.

In step S33, modifying the chromaticity coordinate $(u_k, v_k)$ of the controlled light source 100 to the chromaticity coordinate $(u_r, v_r)$ of the reference light source, i.e., $$\begin{cases} u'_k = u_r \\ v'_k = v_r \end{cases},$$

modifying the chromaticity coordinate $(u_{k,i}v_{k,i})$ of each color sample i of the 14 Munsell color samples of the controlled light source 100 to a chromaticity coordinate $(u'_{k,i}, v'_{k,i})$ of the reference light source, specifically as follows:

according to a formula $$\begin{cases} c = \frac{1}{v} * (4.0 - u - 10v) \\ d = \frac{1}{v}(1.708v + 0.404 - 1.481u) \end{cases},$$

respectively obtaining chromaticity coordinate correction coefficients $c_r$ and $d_r$ of the reference light source:

$$\begin{cases} c_r = \frac{1}{v_r} * (4.0 - u_r - 10v_r) \\ d_r = \frac{1}{v_r}(1.708v_r + 0.404 - 1.481u_r) \end{cases},$$

chromaticity coordinate correction coefficients $c_k$ and $d_k$ of the controlled light source 100:

$$\begin{cases} c_k = \frac{1}{v_k} * (4.0 - u_k - 10v_k) \\ d_k = \frac{1}{v_k}(1.708v_k + 0.404 - 1.481u_k) \end{cases},$$

chromaticity coordinate correction coefficients $c_{k,i}$ and $d_{k,i}$ of each test color of the 14 Munsell color samples under the illumination of the controlled light source 100:

$$\begin{cases} c_{k,i} = \frac{1}{v_{k,i}} * (4.0 - u_{k,i} - 10v_{k,i}) \\ d_{k,i} = \frac{1}{v_{k,i}}(1.708v_{k,i} + 0.404 - 1.481u_{k,i}) \end{cases};$$

and according to the chromaticity coordinate correction coefficients $c_r$ and $d_r$ of the reference light source, the chromaticity coordinate correction coefficients $c_k$ and $d_k$ of the controlled light source 100 and the chromaticity coordinate correction coefficients $c_{k,i}$ and $d_{k,i}$ of each test color of the 14 Munsell color samples under the illumination of the controlled light source 100, obtaining the corrected chromaticity coordinates $u'_{k,i}v'_{k,i}$ of each color sample i of the 14 Munsell color samples of the controlled light sourc 100:

$$\begin{cases} u'_{k,i} = \dfrac{10.872 + 0.404 * (C_r/C_k) * C_{k,i} - 4 * \left(\frac{d_r}{d_k}\right) * d_{k,i}}{16.518 + 1.481 * (C_r/C_k) * C_{k,i} - \left(\frac{d_r}{d_k}\right) * d_{k,i}} \\ v'_{k,i} = \dfrac{5.520}{16.518 + 1.481 * (C_r/C_k) * C_{k,i} - \left(\frac{d_r}{d_k}\right) * d_{k,i}} \end{cases}.$$

In step S34, according to the chromaticity coordinate $(u_{r,i}, v_{r,i})$ of each test color of the 14 Munsell color samples of the reference light source and the chromaticity coordinate $(u_r, v_r)$ of the reference light source, calculating the coordinate values $$U^*_{r,i},\ V^*_{r,i} \text{ and } W^*_{r,i}: \begin{cases} W^*_{r,i} = 25Y_{r,i}^{\frac{1}{3}} - 17 \\ U^*_{r,i} = 13W^*_{r,i}(u_{r,i} - u_r) \\ V^*_{r,i} = 13W^*_{r,i}(v_{r,i} - v_r) \end{cases}$$

of each test color of the 14 Munsell color samples of the reference light source in a CIE1964 uniform color space; wherein $Y_{r,i}^{1/3}$ is the ⅓ square root coefficient of the tristimulus value Y of each test color of the 14 Munsell color samples of the reference light source, wherein $1 \le Y \le 100$; and according to the CIE1976 UCS corrected chromaticity coordinate $u'_{k,i}v'_{k,i}$ of each test color of the 14 Munsell color samples of the controlled light source 100 and the corrected chromaticity coordinate $(u'_k, v'_k)$ of the controlled light source 100, calculating coordinate values $$U^*_{k,i},\ V^*_{k,i} \text{ and } W^*_{k,i}: \begin{cases} W^*_{k,i} = 25Y_{k,i}^{\frac{1}{3}} - 17 \\ U^*_{k,i} = 13W^*_{r,i}(u'_{r,i} - u'_k) \\ V^*_{k,i} = 13W^*_{r,i}(v'_{r,i} - v'_k) \end{cases}$$

of each test color of the 14 Munsell color samples of the controlled light source 100 in the CIE1964 uniform color space, wherein $Y_{k,i}^{1/3}$ is the ⅓ square root coefficient of the tristimulus value Y of each test color of the 14 Munsell color samples of the controlled light source 100, wherein $1 \le Y \le 100$.

In step S35, using the color difference formula of CIE1964 to obtain the color difference $\Delta E_i[(U_{r,i}^* - U_{k,i}^*)^2 + (V_{r,i}^* - V_{k,i}^*)^2 + (W_{r,i}^* - W_{k,i}^*)^2]$ of the test color i of the same Munsell color sample corresponding to the controlled light source 100 and the reference light source, and judging whether the color difference $\Delta E_i$ of the test color i of each Munsell color sample is within the range of color differences of 14 Munsell color samples of the target spectrum, if yes, retaining the set of values of $K_1$ and $K_2$, and otherwise, verifying a next set of values of $K_1$ and $K_2$. Therefore, the values of $K_1$ and $K_2$ enabling the relative spectral power distribution $P_{synthesized}(\lambda)$ of the spectrum of synthesized lighting of the controlled light source 100 to conform to the range of color differences of 14 Munsell color samples of the target spectrum are acquired.

Figure 5:
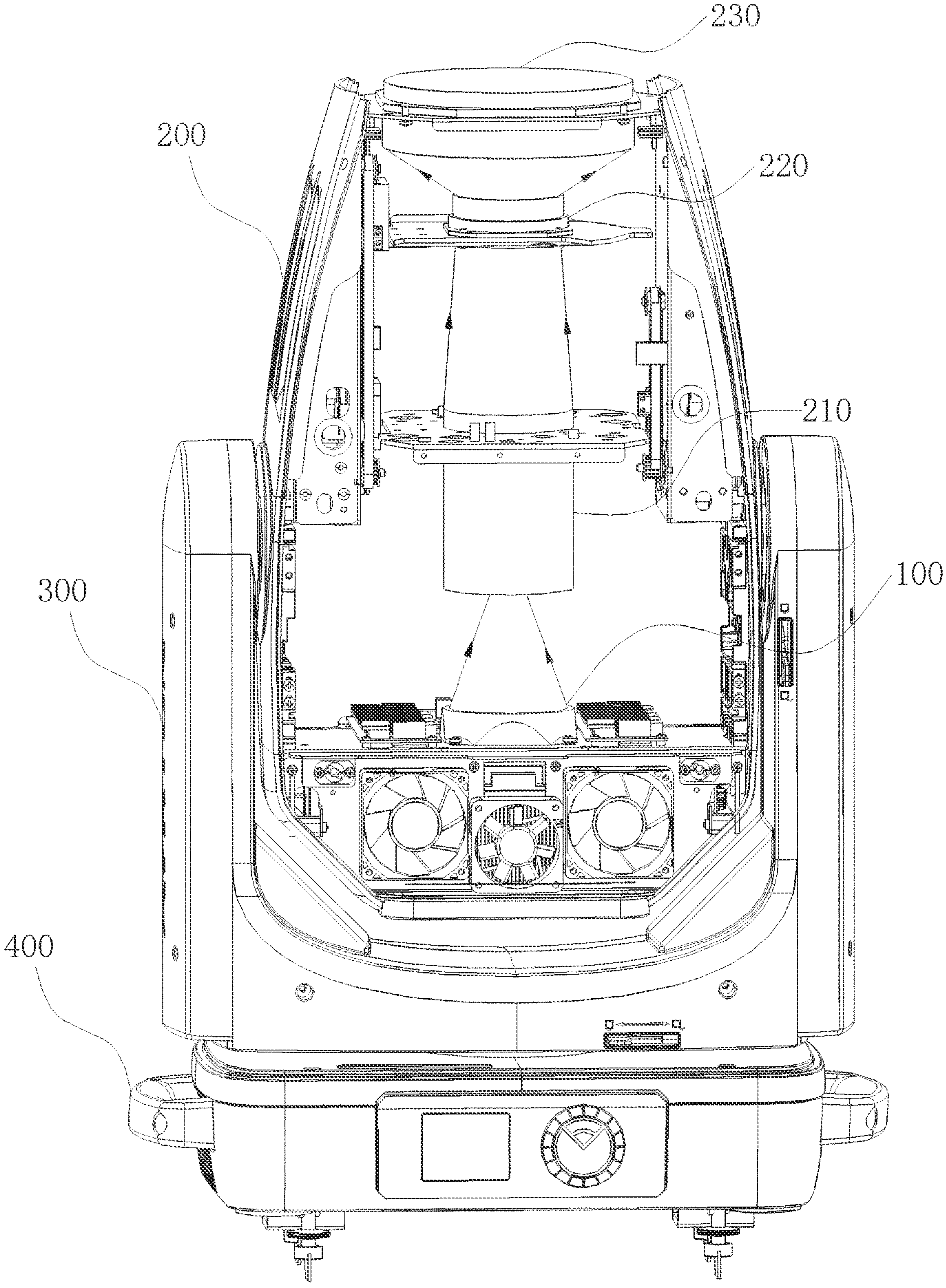
FIG. 5 is a schematic diagram of an overall structure of a stage light fixture according to the present invention.

FIG. 5 provides a stage light fixture, which uses the method described above to adjust the color rendering index of a controlled light source 100 in a light head 200.

The stage light fixture generally includes the light head 200, a support arm 300, and a case 400, the case 400 supporting the support arm 300 to rotate, the support arm 300 supporting the light head 200 to rotate, and the controlled light source 100 being located in the light head 200. Light emitted from the controlled light source 100 passes through a focusing lens 210, a magnifying lens 220 and a fixed lens 230 in sequence and then is emitted out.

Figure 6:
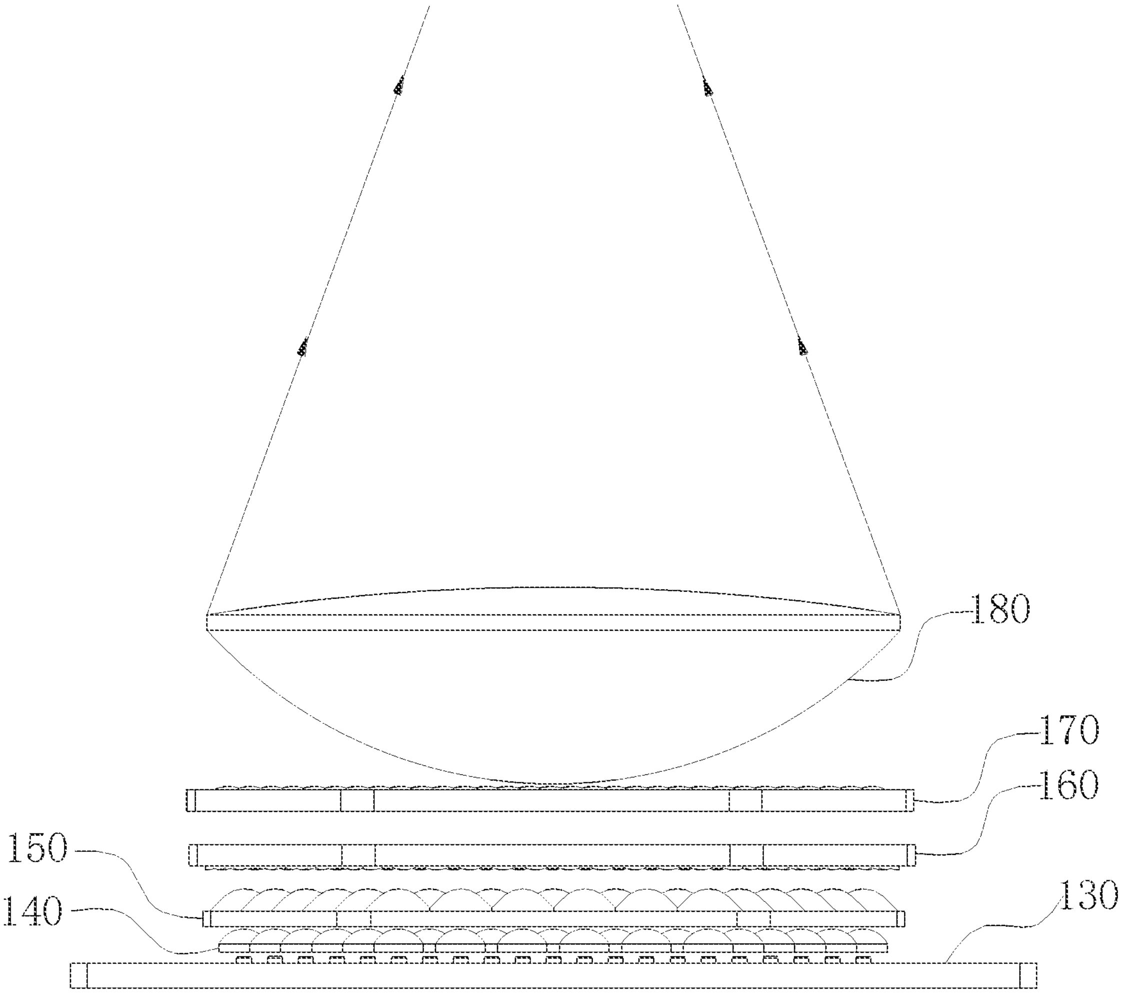
FIG. 6 is a schematic diagram of a light concentrating structure of the controlled light source according to the present invention.

As in FIG. 6, the controlled light source 100 includes a circuit board 130 provided with light-emitting chips, including the first LED chip set 110 and the second LED chip set 120, and further includes a first light receiving lens 140, a second light receiving lens 150, a first light mixing lens 160, a second light mixing lens 170, and a light receiving lens 180 which are arranged in the light emitting direction of the light-emitting chip in sequence.

It is apparent that those skilled in the art should know that each module or each step of the present disclosure may be implemented by a universal computing device, and the modules or steps may be concentrated on a single computing device or distributed on a network formed by a plurality of computing devices, and may optionally be implemented by program codes executable for the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. Therefore, the present disclosure is not limited to any specific hardware and software combination.

The universal computing device generally includes a processor and a memory, the memory storing computer-readable instructions, and the computer-readable instructions, when being executed by the processor, cause the processor to implement the multiple modules or steps in the present invention.

Obviously, the above-mentioned embodiments of the present invention are only examples for clearly illustrating the present invention, rather than limiting the implementation modes of the present invention. For those of ordinary skill in the art, changes or modifications in other different forms can also be made on the basis of the above description. It is not needed and it is impossible to list all the implementation modes here. Any modifications, equivalent replacements and improvements made within the spirit and principles of the present invention shall be included within the protection scope of the claims of the present invention.

The invention claimed is:

1. A method for adjusting color rendering index of a light source, the controlled light source has a first LED chip set and a second LED chip set, wherein the first LED chip set has a first color rendering index, and the second LED chip set has a second color rendering index, the method comprises step of:

S1. acquiring color temperature of the first LED chip set and the color temperature of the second LED chip set, and respective relative spectral power distributions $P_A(\lambda)$ and $P_B(\lambda)$ at the maximum brightness of the first LED chip set and the second LED chip set, and normalizing the relative spectral power distributions $P_A(\lambda)$ and $P_B(\lambda)$, normalization coefficients being denoted as $K_A$ and $K_B$;

S2. according to an input target color rendering index and a target color temperature, obtaining a normalized relative spectral power distribution $P_{target}(\lambda)$ of a reference light source, which is taken as a target spectrum, and defining a range of chromaticity differences of the target spectrum and a range of color differences of 14 Munsell color samples of the target spectrum;

S3. repeatedly adjusting a light intensity control parameter $K_1$ of the first LED chip set and a light intensity control parameter $K_2$ of the second LED chip set, wherein $0 \le K_1 \le K_A$ and $0 \le K_2 \le K_B$, calculating a relative spectral power distribution $P_{synthesized}(\lambda)=K_1P_A(\lambda)+K_2P_B(\lambda)$ of a spectrum of a synthesized lighting of the controlled light source according to $K_1$, $K_2$, $P_A(\lambda)$ and $P_B(\lambda)$, and searching for values of $K_1$ and $K_2$ enabling the relative spectral power distribution $P_{synthesized}(\lambda)$ to fall within the range of chromaticity differences of the target spectrum and the range of color differences of 14 Munsell color samples of the target spectrum; and S4, according to the found values of $K_1$ and $K_2$, respectively controlling the first LED chip set and the second LED chip set to emit lighting.

2. The method according to claim 1, wherein the first LED chip set and the second LED chip set have the same color temperature, and the target color temperature is the color temperature of the first LED chip set and the second LED chip set.

3. The method according to claim 1, wherein when color temperature of the controlled light source is greater than 5000 K, a CIE standard illuminant D is selected as the reference light source, and when the color temperature of the controlled light source is less than 5000 K, a blackbody radiation light source is selected as the reference light source.

4. The method according to claim 1, wherein the first LED chip set and the second LED chip set are both white light chips.

5. The method according to claim 1, wherein in step S3, after finding the first set of values of $K_1$ and $K_2$ enabling the normalized $P_{synthesized}(\lambda)$ to approach the target spectrum, changing the first set of the values of $K_1$ and $K_2$ within a certain range to calculate the relative spectral power distribution $P_{synthesized}(\lambda)$ of the spectrum of the synthesized lighting according to changed values of $K_1$ and $K_2$ and normalizing same, and searching for other values of $K_1$ and $K_2$ enabling the normalized $P_{synthesized}(\lambda)$ to approach the target spectrum.

6. The method according to claim 5, wherein an interpolation method is used to search for the first set of values of $K_1$ and $K_2$ enabling the normalized $P_{synthesized}(\lambda)$ to approach the target spectrum.

7. The method according to claim 6, wherein the interpolation method is also used when changing the first set of values of $K_1$ and $K_2$ within the certain range, and an order of magnitude of the interpolation method during changing is than that of the interpolation method when searching for the first set of values of $K_1$ and $K_2$.

8. The method according to claim 5, wherein when $K_A=1$ and $K_B=1$, the first set of the values of $K_1$ and $K_2$ are changed within the certain range from $K_1-0.1$ to $K_1+0.1$ and $K_2-0.1$ to $K_2+0.1$.

9. The method according to claim 1, wherein in step S3, a plurality of sets of eligible values of $K_1$ and $K_2$ are searched, and power and brightness of the synthesized lighting at each set of the eligible values of $K_1$ and $K_2$ are calculated; and in step S4, a set of proper values of $K_1$ and $K_2$ are selected according to certain power or brightness requirements to respectively control the first LED chip set and the second LED chip set to emit lighting.

10. The method according to claim 9, wherein in step S4, according to an input power of the synthesized lighting, values of $K_1$ and $K_2$ corresponding to the power of the synthesized lighting are selected from a plurality of sets of values of $K_1$ and $K_2$ under the target color rendering index.

11. The method according to claim 9, wherein in step S4, values of $K_1$ and $K_2$ for maximizing the power of the synthesized lighting are selected from a plurality of sets of values of $K_1$ and $K_2$ under the target color rendering index.

12. The method according to claim 9, wherein in step S4, values of $K_1$ and $K_2$ for maximizing the brightness of the synthesized lighting are selected from a plurality of sets of values of $K_1$ and $K_2$ under the target color rendering index.

13. The method according to claim 1, wherein in step S3, the chromaticity difference satisfies requirements of a color range in different color intervals corresponding to MacAdam ellipse on a CIE1976 UCS diagram.

14. The method according to claim 1, wherein in step S3, the method for searching for values of $K_1$ and $K_2$ enabling the relative spectral power distribution $P_{synthesized}(\lambda)$ to fall within the range of color differences of 14 Munsell color samples of the target spectrum comprises steps of:

S31. according to $\varphi_k(\lambda)$ corresponding to a certain set of values of $K_1$ and $K_2$, working out a color coordinate $(x_k, y_k)$, a tristimulus value $(X_k, Y_k, Z_k)$ and a CIE1976 UCS chromaticity coordinate $(u_k, v_k)$ of the controlled light source, and a color coordinate $(x_{k,i}y_{k,i})$, a CIE tristimulus value $(X_{k,i}, Y_{k,i}, Z_{k,i})$ and a chromaticity coordinate $(u_{k,i}, v_{k,i})$ of each test color i (i=1, 2, 3 . . . , 14) of 14 Munsell color samples of the controlled light source, wherein $\varphi_k(\lambda)=P_{synthesized}(\lambda)$;

S32. according to the relative spectral power distribution $P_{target}(\lambda)$ of the reference light source, calculating a chromaticity coordinate $(u_{r,i}, v_{r,i})$ of each test color i (i=1, 2, 3 . . . , 14) of 14 Munsell color samples of the reference light source and a CIE1976 UCS chromaticity coordinate $(u_r, r_r)$;

S33. correcting the chromaticity coordinate $(u_k, v_k)$ of the controlled light source to the chromaticity coordinate $(u_r, v_r)$ of the reference light source, i.e., $$\begin{cases} u'_k = u_r \\ v'_k = v_r \end{cases},$$

correcting the chromaticity coordinate $(u_{k,i}, v_{k,i})$ of each color sample i of the 14 Munsell color samples of the controlled light source to a chromaticity coordinate $(u'_{k,i}v'_{k,i})$ of the reference light source, including:

according to a formula $$\begin{cases} c = \frac{1}{v} * (4.0 - u - 10v) \\ d = \frac{1}{v}(1.708v + 0.404 - 1.481u) \end{cases},$$

respectively obtaining chromaticity coordinate correction coefficients $c_r$ and $d_r$ of the reference light source:

$$\begin{cases} c_r = \frac{1}{v_r} * (4.0 - u_r - 10v_r) \\ d_r = \frac{1}{v_r}(1.708v_r + 0.404 - 1.481u_r) \end{cases},$$

chromaticity coordinate correction coefficients $c_k$ and $d_k$ of the controlled light source:

$$\begin{cases} c_k = \frac{1}{v_k} * (4.0 - u_k - 10v_k) \\ d_k = \frac{1}{v_k}(1.708v_k + 0.404 - 1.481u_k) \end{cases},$$

chromaticity coordinate correction coefficients $c_{ki}$ and $d_{ki}$ of each test color of the 14 Munsell color samples under the illumination of the controlled light source:

$$\begin{cases} c_{k,i} = \frac{1}{v_{k,i}} * (4.0 - u_{k,i} - 10v_{k,i}) \\ d_{k,i} = \frac{1}{v_{k,i}}(1.708v_{k,i} + 0.404 - 1.481u_{k,i}) \end{cases};$$

according to the chromaticity coordinate correction coefficients $c_r$ and $d_r$ of the reference light source, the chromaticity coordinate correction coefficients $c_k$ and $d_k$ of the controlled light source, and the chromaticity coordinate correction coefficients $c_{k,i}$ and $d_{k,i}$ of each test color of the 14 Munsell color samples under illumination of the controlled light source, obtaining the corrected chromaticity coordinates $u'_{k,i}v'_{k,i}$ of each color sample i of the 14 Munsell color samples of the controlled light source:

$$u'_{k,i} = \frac{10.872 + 0.404 * (C_r/C_k) * C_{k,i} - 4 * \left(\frac{d_r}{d_k}\right) * d_{k,i}}{16.518 + 1.481 * (C_r/C_k) * C_{k,i} - \left(\frac{d_r}{d_k}\right) * d_{k,i}};$$
$$v'_{k,i} = \frac{5.520}{16.518 + 1.481 * (C_r/C_k) * C_{k,i} - \left(\frac{d_r}{d_k}\right) * d_{k,i}}$$

S34. according to the chromaticity coordinate $(u_{r,i}, v_{r,i})$ of each test color of the 14 Munsell color samples of the reference light source and the chromaticity coordinate $(u_r, v_r)$ of the reference light source, calculating the coordinate values $$U^*_{r,i}, V^*_{r,i} \text{ and } W^*_{r,i}: \begin{cases} W^*_{r,i} = 25Y_{r,i}^{\frac{1}{3}} - 17 \\ U^*_{r,i} = 13W^*_{r,i}(u_{r,i} - u_r) \\ V^*_{r,i} = 13W^*_{r,i}(v_{r,i} - v_r) \end{cases}$$

of each test color of the 14 Munsell color samples of the reference light source in a CIE1964 uniform color space; wherein $Y_{r,i}^{1/3}$ is the ⅓ square root coefficient of the tristimulus value Y of each test color of the 14 Munsell color samples of the reference light source, wherein 1≤Y≤100;

according to the CIE1976 UCS corrected chromaticity coordinate $u'_{k,i}v'_{k,i}$ of each test color of the 14 Munsell color samples of the controlled light source and the corrected chromaticity coordinate $(u'_k, v'_k)$ of the controlled light source, calculating coordinate values $$U^*_{k,i}, V^*_{k,i} \text{ and } W^*_{k,i}: \begin{cases} W'_{k,i} = 25Y_{k,i}^{\frac{1}{3}} - 17 \\ U^*_{k,i} = 13W^*_{r,i}(u'_{r,i} - u'_k) \\ V^*_{k,i} = 13W^*_{r,i}(v'_{r,i} - v'_k) \end{cases}$$

of each test color of the 14 Munsell color samples of the controlled light source in the CIE1964 uniform color space, wherein $Y_{k,i}^{1/3}$ is the ⅓ square root coefficient of the tristimulus value Y of each test color of the 14 Munsell color samples of the controlled light source, wherein 1≤Y≤100; and S35. using a color difference formula of CIE1964 to obtain a color difference $\Delta E_i[(U_{r,i}^* - U_{k,i}^*)^2 + (V_{r,i}^* - V_{k,i}^*)^2 + (W_{r,i}^* - W_{k,i}^*)^2]$ of the test color i of the same Munsell color sample corresponding to the controlled light source and the reference light source, and judging whether the color difference $\Delta E_i$ of the test color i of each Munsell color sample is within the range of color differences of 14 Munsell color samples of the target spectrum, if yes, retaining the set of values of $K_1$ and $K_2$, and otherwise, verifying a next set of values of $K_1$ and $K_2$.

15. A stage light fixture, using the method according to claim 1 to adjust the color rendering index of the controlled light source within a light head.

* * * * *